United States Patent
Savage et al.

(10) Patent No.: US 6,579,637 B1
(45) Date of Patent: Jun. 17, 2003

(54) FUEL CELL SYSTEM HAVING A COMPACT WATER SEPARATOR

(75) Inventors: David R Savage, Rochester, NY (US);
Trevor T. Grover, Rushville, NY (US);
Jameson R. Forte, Webster, NY (US);
Eric K. Jensen, Spencerport, NY (US)

(73) Assignee: General Motors Corporation, Detroit, MI (US)

( * ) Notice: Subject to any disclaimer, the term of this patent is extended or adjusted under 35 U.S.C. 154(b) by 479 days.

(21) Appl. No.: 09/584,065

(22) Filed: May 31, 2000

(51) Int. Cl.[7] .................................................. H01M 8/04
(52) U.S. Cl. .......................................... 429/12; 429/34
(58) Field of Search .............................. 429/12, 13, 14, 429/17, 22, 25, 34; 210/104, 180, 186.01, 512.1, 787

(56) References Cited

PUBLICATIONS

Illustration of Water Separator sold by Allied Signal Corporation for Refrigeration Units before Applicants made their invention.

*Primary Examiner*—Stephen Kalafut
*Assistant Examiner*—M. Wills
(74) *Attorney, Agent, or Firm*—Cary W. Brooks (57) ABSTRACT

A fuel cell system including a compact, low-pressure-drop, high efficiency water-separator for separating liquid water from water-laden streams of the system. A cyclonic separator includes a sump for collecting the water, a drain for removing the water from the sump and directing it to a reservoir, a shutoff valve associated with the drain for controlling flow through from the drain, and a water level switch that controls the opening/closing of the valve. The switch triggers closing of the valve before the sump is emptied to provide a water seal that prevents escape of gas through the drain.

14 Claims, 5 Drawing Sheets

FUEL CELL SYSTEM HAVING A COMPACT WATER SEPARATOR

TECHNICAL FIELD

This invention relates to fuel cell systems, and more particularly to water separators therefor.

BACKGROUND OF THE INVENTION

Fuel cells in general, and PEM fuel cells in particular, have been proposed for use as electrical power plants to replace internal combustion engines, among other applications. PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The solid polymer electrolyte is typically made from an ion-exchange resin such as perfluoronated sulfonic acid. The anode/cathode typically comprise finely divided catalytic particles (often supported on carbon particles) admixed with proton conductive resin. The MEA is sandwiched between a pair of electrically conductive elements which serve both as current collectors and means for distributing the fuel cell's gaseous reactants over the surfaces of the electrodes. In such PEM fuel cells, hydrogen is the anode reactant (i.e. fuel), oxygen (i.e. from air) is the cathode reactant (i.e. oxidant), and they react together to produce electricity and water. The cathode/air stream (and sometimes the anode/$H_2$ stream) is typically humidified to keep the ion-exchange membrane from drying out.

Some fuel cell systems use pressurized, or liquid, hydrogen fuel to fuel the fuel cell. Others store the hydrogen chemically as a thermally dissociable hydride, or physiochemically by heat-releasable adsorption on a suitable adsorbent (e.g. carbon nanofibers). For vehicular applications however, it is desirable to dissociate hydrogenous liquids such as gasoline, methanol, or the like to provide the hydrogen used by the fuel cell owing to the ease with which they can be stored on the vehicle. Gasoline is particularly desirable owing to the existence of a nationwide supply infrastructure therefor. To release their hydrogen, hydrogenous liquids are dissociated in a so-called "fuel processor".

One known fuel processor for dissociating gasoline to form hydrogen is a two stage chemical reactor often referred to as an "autothermal reformer". In an autothermal reformer, gasoline and water vapor (i.e. steam) are mixed with air and pass sequentially through two reaction sections, i.e. a first "partial oxidation" (POX) section, and a second "steam reforming" (SR) section. In the POX section, the gasoline reacts exothermically with a substoichiometric amount of air to produce carbon monoxide, hydrogen and lower hydrocarbons (e.g. methane). The hot POX reaction products pass into the SR section where the lower hydrocarbons react with the steam to produce a reformate gas comprising principally hydrogen, carbon dioxide, carbon monoxide and nitrogen. The SR reaction is endothermic, but obtains its required heat from the heat that is carried forward into the SR section from the POX section by the POX effluent. One such autothermal reformer is described in International Patent Publication Number WO 98/08771 published Mar. 5, 1998. The process of producing hydrogen from methanol is similar to that used for gasoline except that the POX step is eliminated and the methanol is delivered directly to a steam reformer where it reacts with steam to produce a reformate comprising $H_2$, $CO_2$ and CO. One known fuel processor for dissociating methanol is a steam reformer such as described in U.S. Pat. No. 4,650,727 to Vanderborgh.

The carbon monoxide concentration in the reformate exiting a steam reformer is too high for the reformate to be used in a fuel cell without poisoning it. Accordingly, the CO concentration must be reduced to a very low level that is non-toxic to the fuel cell. It is known to cleanse the reformate of CO by subjecting it to a so-called "water-gas-shift" (WGS) reaction which takes place in a WGS reactor located downstream of the SR reactor. In the WGS reaction, water (i.e. steam) reacts endothermically with the carbon monoxide according to the following ideal shift reaction:

$$CO + H_2O \rightarrow CO_2 + H_2$$

Some CO survives the water-gas-shift reaction, and must be further reduced (i.e. to below about 20 ppm) before the reformate can be sent to the fuel cell. It is known to further reduce the CO content of $H_2$-rich reformate by selectively reacting it with oxygen (i.e. as air) in a so-called PrOx (i.e. preferential oxidation) reaction which is carried out in a catalytic PrOx reactor located downstream of the water-gas-shift reactor. The PrOx reaction is exothermic and proceeds as follows:

$$CO + 1/2 O_2 \rightarrow CO_2$$

The combination of a WGS reaction followed by a PrOx reaction is usually sufficient to cleanse the reformate enough that it can be then used in the fuel cell.

It is known to burn the cathode and anode tailgases exiting the fuel cell in a combuster to remove any hydrogen from the system's exhaust gasses, and to provide heat for use elsewhere in the system. e.g. (1) to heat a methanol reformer, or (2) to vaporize liquid fuel and water for use in the system. Moreover, it is known that water management of fuel cell systems that are to be used for vehicular applications (i.e. cars, trucks, buses etc.) is an important consideration. In this regard, it is desirable to collect the water generated by the fuel cell and reuse it elsewhere in the system (e.g., in a fuel processor, water-gas shift reactor or humidifier) where it is needed rather than storing an extra supply of water on-board for such system needs. Moreover, it is desirable to minimize the amount of liquid water in the various system streams so as not to detrimentally effect reactors supplied by such streams. Hence for example, liquid water should be eliminated from the fuel cell tailgases, and particularly the cathode tailgas, that are supplied to the combuster so as not to drown the combuster catalyst, or otherwise suppress combustion of the tailgases therein. Similarly, it is desirable to insure that the $H_2$-rich fuel gas supplied to the anode and/or cathode sides of the fuel cell contain little or no liquid water that could either drown the catalyst or flood the fuel cell and thereby reduce its effectiveness. It is likewise desirable to recapture water from the exhaust system from the system's combustor. Accordingly, it is known to provide one or more mechanical water separators at various locations within the system to remove liquid water from the various gas streams and direct it to a water collection site. This practice adds additional equipment to the system which is undesirable for vehicular applications particularly since the water separators that have been used heretofore have been large, inefficient and/or have too much pressure drop which is wasteful of system energy.

The present invention mitigates the undesirable impact of mechanical water separators in fuel cell systems for vehicular applications by providing a separator which (1) is compact so as not to consume much space in the vehicle's engine compartment, (2) has a high separating efficiency so as to ensure a high degree of water removal and collection, and (3) has a low pressure drop.

SUMMARY OF THE INVENTION

The present invention relates to a fuel cell system having a compact, efficient, low-pressure-drop water separator for removing liquid water droplets from water-laden system streams. The invention is applicable to all fuel cell systems that comprise a fuel cell, a source of $H_2$-rich fuel-gas for fueling the fuel cell, a source of oxygen (e.g. air) for electrochemically reacting with the $H_2$ in the fuel cell, and a reservoir for collecting water separated from the various system streams for reuse elsewhere in the system (e.g. in a fuel processor or humidifier for the $H_2$ and/or $O_2$ streams). Broadly speaking, the invention is applicable to a fuel cell system comprising (1) a fuel cell, (2) a source of $H_2$-rich fuel-gas providing a fuel stream for said fuel cell, (3) a source of oxygen providing an oxidant stream for electrochemically reacting with the $H_2$-rich fuel-gas in the fuel cell, (4) an anode exhaust stream comprising $H_2$-depleted fuel-gas exiting the fuel cell, (5) a cathode exhaust stream comprising water, oxygen and nitrogen exiting the fuel cell, (6) at least one water separator for removing water from at least one of the system's streams that is laden with liquid water, and (7) a reservoir for collecting the water removed from the water-laden stream for reuse within the system. More specifically, the invention is directed to such a fuel cell system where the separator is a cyclonic separator that has a collection tube having an internal cylindrical wall defining a collection chamber through which the water-laden stream flows. The collection tube has an inlet through which the water-laden stream enters the chamber, and an outlet through which the separated water exits the chamber. A swirler at the inlet to the collection tube imparts a whirling motion to the water-laden stream entering the chamber that centrifugally propels the water out of the water-laden stream onto the wall while urging the water along the wall toward the outlet. According to one embodiment of the invention, the swirler comprises a plurality of arcuate vanes positioned in the inlet to the collection tube. Alternatively, the swirler may comprise the inlet to the collection tube being arranged and adapted so as to introduce the water-laden stream tangentially into the collection tube. A sump underlies the outlet of the collection tube to collect the water that has migrated to the outlet along the wall. A baffle between the outlet and the sump serves to admit the water into the sump while preventing water in the sump from escaping the sump and re-entraining in the stream passing through the separator. A drain communicates with the sump to drain-off the water from the sump into the reservoir. A valve that is operatively associated with the drain controls draining of the water from the sump so as to maintain a sufficient level of water in the sump to provide a water seal that prevents the stream passing through the separator from escaping the separator via the drain. A liquid level switch is coupled with the sump to trigger closing of the valve before that level drops too low to maintain the water seal. The separator has an exhaust tube for exhausting the water-depleted vapor stream from the separator. The exhaust tube has (1) a mouth at one end that is substantially concentric with the collection tube radially inboard the cylindrical inner wall of the collection tube to receive the water-depleted stream passing through the separator from the collection chamber, and (2) an outlet end for discharging the water-depleted vapor stream from the separator.

According to a preferred embodiment, the invention involves a fuel cell system comprising (1) a fuel cell, (2) a fuel processor for converting a hydrogenous fuel such as methanol or hydrocarbon into a CO-containing, $H_2$-rich fuel-gas for fueling the fuel cell, (3) a water-gas-shift reactor downstream of the fuel processor for reacting the CO-containing, $H_2$-rich fuel-gas with steam to increase its $H_2$ content and decrease its CO content, (4) a water separator downstream of the fuel cell to remove water from a water-laden effluent therefrom (e.g. cathode tailgas), and (5) a reservoir for collecting the water removed from the effluent for reuse in the fuel processor and/or the water-gas-shift reactor. More specifically, the preferred fuel cell system has a cyclonic, water-gas separator that mechanically separates water from the effluent without loss of any of the gas that carries the water. The separator comprises a collection tube that has an internal cylindrical wall that defines a collection chamber through which the water-laden stream flows and is separated (i.e. into water and carrier gas). The collection tube has an inlet through which the water-laden gas enters the chamber, and an outlet through which water exits the chamber. A swirler located at the inlet imparts a whirling motion to the gas that (1) centrifugally propels the water onto the cylindrical wall, and (2) urges the water layer that forms on the wall toward the outlet. A sump underlies the outlet of the collection tube to collect the water that has been pushed to the outlet along the wall by the swirling gas. A baffle between the outlet and the sump serves to admit the water into the sump while preventing water in the sump from escaping the sump and reentering the carrier gas. A preferred such baffle has a plurality of apertures therein through which the water enters the sump, and will, most preferably, surround the outlet of the collection tube. The sump has a drain to drain away any water that accumulates in the sump. The drain includes a shut-off valve that controls on-off flow through the drain, the valve closes to prevent outflow of water from the sump while there is still sufficient water in the sump to provide a liquid seal that prevents escape of the carrier gas through the drain. Opening and closing of the valve is controlled by a switch (e.g. a float-switch) that determines the level of the water in the sump, and triggers closing of the valve before the level of the water in the sump gets too low to prevent the escape of the carrier gas through the drain. The separator also includes an exhaust tube having a mouth at one end that is substantially concentric with, and radially inboard the wall of, the collection tube. The mouth of the exhaust tube receives water-depleted carrier-gas from the longitudinal central region of the chamber. An exhaust end at the other end of the exhaust tube opposite the mouth discharges the water-depleted carrier-gas from the separator, e.g. into a combuster. In a most preferred embodiment of the invention, the fuel cell is a PEM fuel cell and the system further includes a humidifier upstream of the fuel cell that receives water from the reservoir for humidifying the cathode air stream. The water could likewise be directed from the reservoir to the fuel processor or water-gas-shift reactor.

In one embodiment of the separator that is adapted for in-line installation in a fuel cell system, the collection and exhaust tubes are aligned with each other along a common axis such that the inlet to the collection tube confronts the mouth of the exhaust tube and is aligned with the exhaust end of the exhaust tube. In another embodiment, the mouth of the exhaust tube lies on the same longitudinal axis as the collection tube, but the exhaust end of the exhaust tube lies along a different axis that is at an acute angle (e.g. 90°) to the longitudinal axis of the collection tube. In this latter embodiment, the collection tube has an inlet at one end, an outlet at the opposite end, an endwall adjacent the outlet, and the mouth of the exhaust tube confronts the endwall such that the gas flows (a) in a first general direction along the wall of the collection tube from the inlet toward the endwall, and (b) is then deflected off the end wall so as to flow through the center of the collection tube in a second general direction opposite the first general direction and into the mouth of the exhaust tube. This latter embodiment is particularly useful for non-in-line installations.

DESCRIPTION PREFERRED EMBODIMENTS

The invention will better be understood when considered in the light of the following detailed description of certain embodiments thereof which is given hereafter in conjunction with the several figures.

Figure 1:
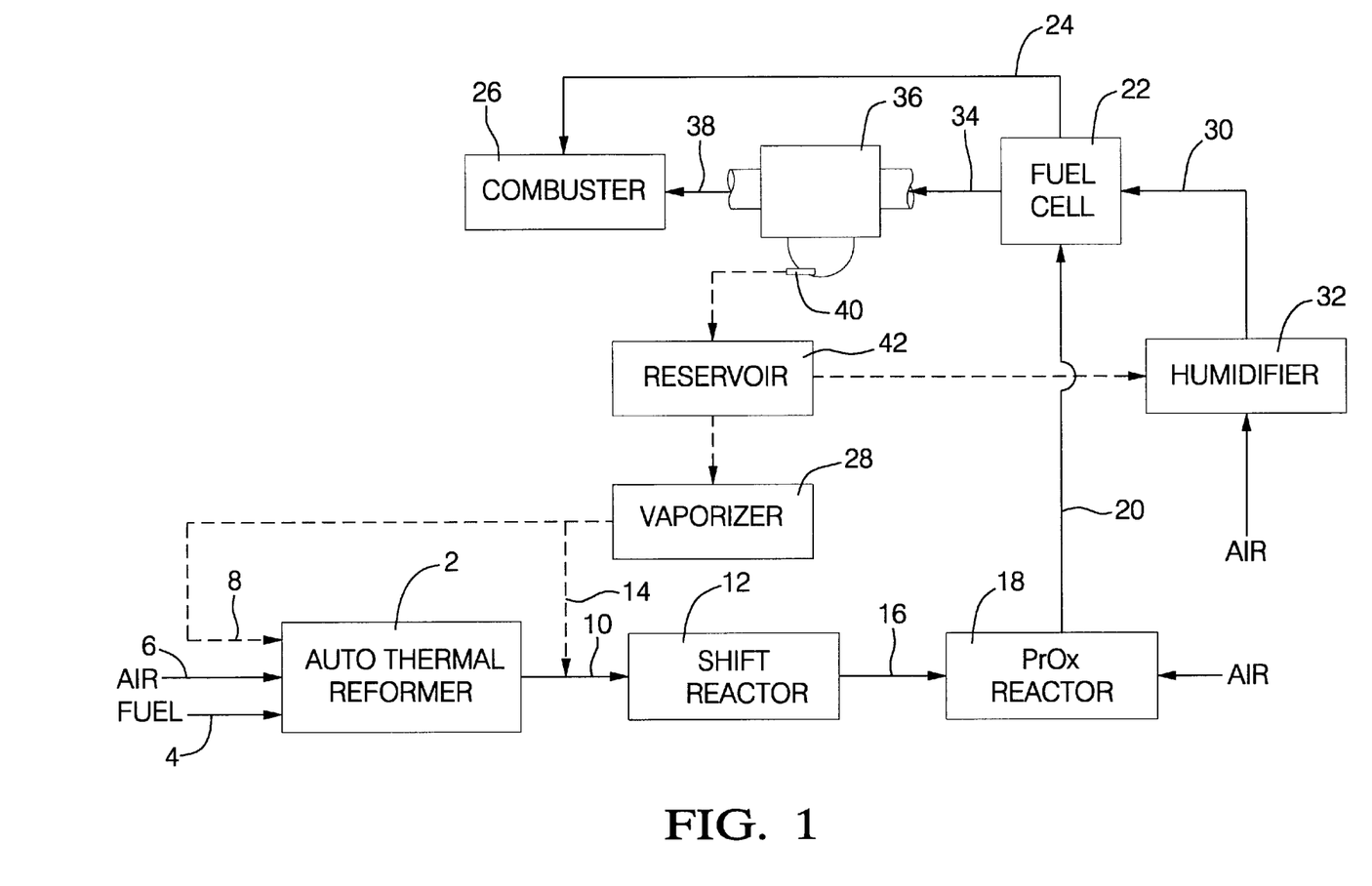
FIG. 1 is a schematic of one fuel cell system in accordance with the present invention.

FIG. 1 depicts a PEM fuel cell system having an autothermal reformer 2 of the type described above having: (1) a POX section for partially oxidizing gasoline from line 4 with a substoichiometric amount of air from line 6 to form an effluent comprising methane, hydrogen, nitrogen, carbon monoxide, and carbon dioxide; and (2) a SR section downstream of the POX section for reacting the POX-produced methane with steam from line 8 to form more hydrogen, carbon dioxide and carbon monoxide. The reformate, or effluent from the autothermal reactor 2, exits the autothermal reformer 2 via stream 10 and enters a water-gas-shift reactor 12 where it is reacted with steam from line 14 to convert the CO in the reformat to hydrogen and $CO_2$. The CO-cleansed reformate exits the water-gas-shift reactor 12 via stream 16 and enters a PrOx reactor 18 where it is further cleansed of CO by reaction with oxygen (as air) as discussed above. The CO-cleansed reformate exits the PrOx reactor 18 via stream 20 and enters the anode side of a PEM fuel cell 22. After reacting in the fuel cell 22, hydrogen-depleted reformate (a.k.a. anode tailgas) exits the anode side of the fuel cell 22 via stream 24 and enters a combuster 26 where it is burned to eliminate any residual H2 and to generate heat for use elsewhere in the system (e.g. in the autothermal reformer 12 or a vaporizer 28).

Air is supplied to the cathode side of the fuel cell 22 via stream 30 after it has been humidified in humidifier 32 to provide needed moisture to the polymer-electrolyte membrane of the PEM fuel cell 22. The fuel cell 22 produces water as a by-product, and rejects it into the cathode air stream (a.k.a. cathode tailgas) 34. The cathode tailgas exits the fuel cell as a gas that contains an appreciable amount of water, i.e. in an annular-dispersed flow condition as entrained water droplets and a film in the wall of the exhaust pipe. If the cathode tailgas in line 34 were to enter the combuster 26 laden with liquid water, the water could drown the combuster catalyst and/or quench the combustion going on therein, and substantially reduce the effectiveness of the combuster 26. In accordance with the present invention, a water separator 36 is interposed between the fuel cell 22 and the combuster 26 to separate liquid water out of the cathode tailgas in line 34. Water-depleted cathode tailgas exits the separator via stream 38, while the water separated from the tailgas exits the separator 36 via a drain 40, and is conveyed to a reservoir 42 for temporary storage, and subsequent reuse with in the system, as may be needed. In the embodiment shown in FIG. 1, that reuse involves conveying the water from reservoir 42 to the vaporizer 28 for vaporization therein and subsequent delivery to the autothermal reformer 2 via line 8 and/or to the water-gas-shift reactor 12, as well as to the humidifier 32.

Figure 2:
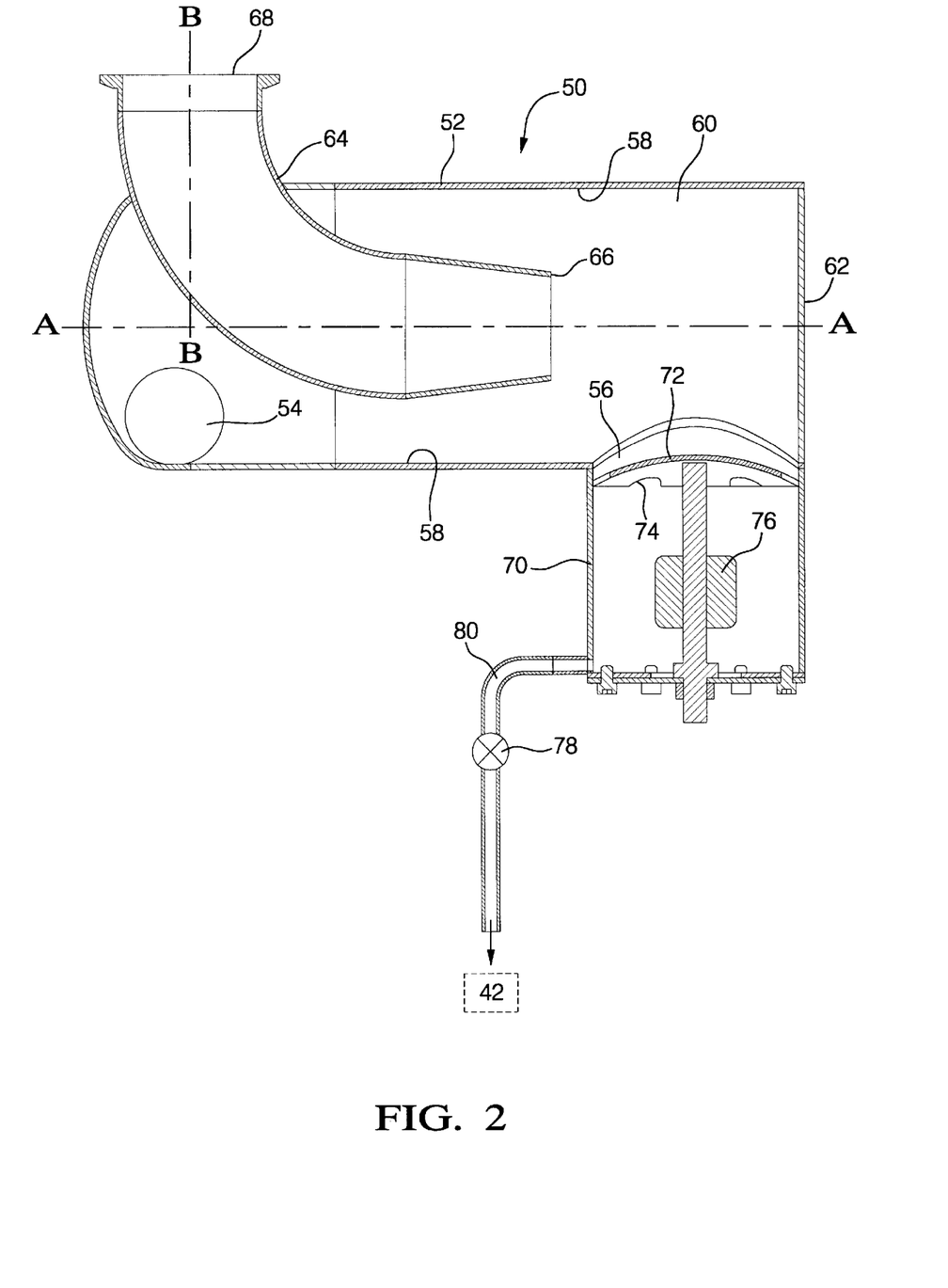
FIG. 2 is a side sectional view of one embodiment of a water separator useful in fuel cell systems in accordance with the present invention.

FIG. 2 is a side sectioned view of one embodiment of a water separator 50, in accordance with the present invention, which embodiment is particularly useful in situations where the system is plumbed such that the system components that are connected by the water-separator are not directly in line with each other—that is to say, they are oriented such that the water-laden stream enters the separator flowing in a first direction and exits the separator flowing in a second direction that is at an acute angle to the first direction. More specifically, FIG. 2 shows a water separator 50 comprising a collection tube 52 having an inlet 54 for admitting a water-laden, fuel cell system stream into the separator 50, and an outlet 56 through which water exits the collection tube 52. The collection tube 52 has an internal cylindrical wall 58 that defines a collection chamber 60. An endwall 62 adjacent the outlet 56 closes off the tube 52. The inlet 54 is arranged tangentially to the tube 52 such that water-laden stream entering the tube 52 is caused to flow along the wall 58 in a rapid swirling motion that causes any water in the stream entering the tube 52 to be flung against the wall 58 by centrifugal force. A curved exhaust tube 64 located near the inlet end 54 of the collection tube 52 has a mouth 66 at one end for receiving the water-depleted stream form the center of the collection chamber, and an exhaust end 68 for discharging the water-depleted stream from the separator 50 (e.g. to the combuster 26 of FIG. 1). Hence. in this embodiment, the center of the mouth 66 of the exhaust tube 64 and the centerline of the collection tube 52 lie on a common axis A—A, and the center of the exhaust end lies on another axis B—B at an acute angle from the axis A—A.

A sump 70 underlies the outlet end 56 of the collection tube 52, and serves to collect the water that was initially flung against the wall 58 and then moved along the wall 58 toward the sump 70 by the action of the swirling carrier-gas moving the length of the collection tube 52. A domed baffle 72 having a plurality of apertures 74 on its periphery crowns the sump 70 and allows the water to run into the sump 70 while, at the same time, preventing the water in the sump from becoming re-entrained in the water-depleted stream moving through the chamber 60 into the mouth 66 of the exhaust tube 64. A float switch 76 senses the level of water in the sump 70 and signals the opening and closing of a shutoff valve 78 located in a drain pipe 80 that leads to the reservoir 42 in FIG. 1. In this regard, the switch 76 will be set to trigger closing of the valve 78 before the sump 70 is completely empty, and more particularly while there is sufficient water remaining in the sump 70 to provide a water seal that prevents the carrier-gas passing through the separator 50 from escaping the separator 50 through the drainpipe 80.

Figure 3:
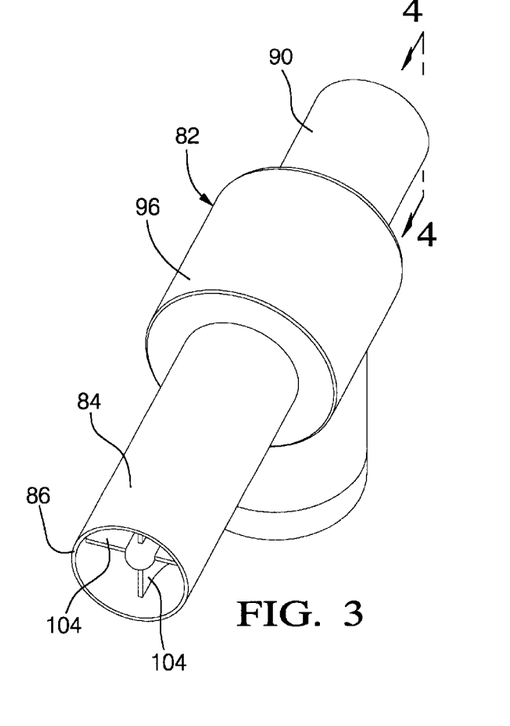
FIG. 3 is an isometric view of another embodiment of a water separator useful in fuel cell systems in accordance with the present invention.
Figure 4:
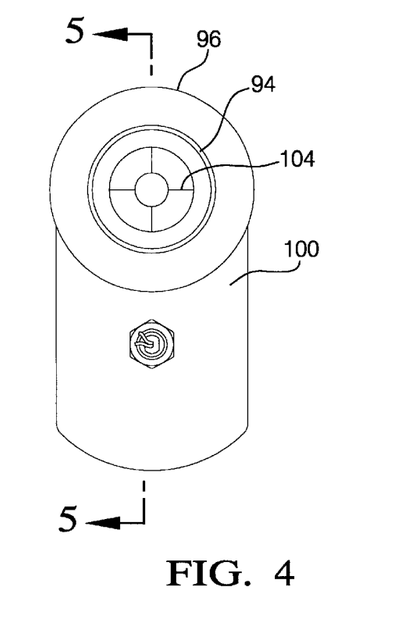
FIG. 4 is an end view in the direction 4—4 of FIG. 3.
Figure 5:
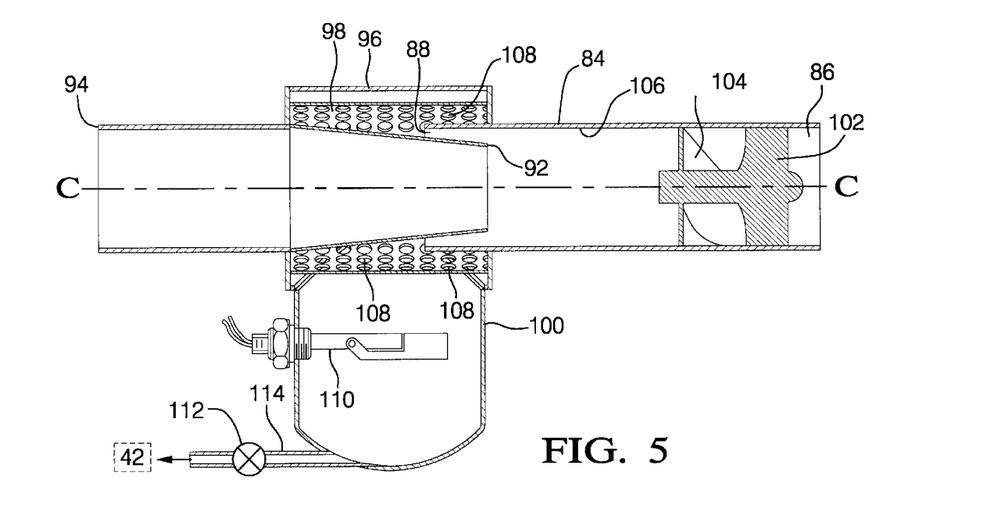
FIG. 5 is a side section view taken in the direction 5—5 of FIG. 4.

FIGS. 3–5 depict a preferred embodiment of a water separator in accordance with the present invention that is particularly adapted to positioning in a water-laden fuel cell system stream that is plumbed such that the system components that are connected by the water-separator are directly in line with each other. More specifically, FIGS. 3–5 show a water-separator 82 having (1) a collection tube 84 with a water-laden stream inlet 86, and a water outlet 88, (2) an exhaust tube 90 with a mouth 92 for receiving liquid water-depleted vapor stream from the collection tube 84, and an exhaust end 94 for exhausting water-depleted vapor/carrier-gas from the separator (e.g. to a combuster), and (3) a housing 96 surrounding the outlet 88. A perforated cylinder or screen 98 located radially inboard the housing 96 also surrounds the outlet 88 and serves as a baffle that allows water to pass therethrough into an underlying sump 100, while preventing water that has entered the sump 100 from becoming re-entrained in the vapor stream passing through the separator 82. A swirler 102 is located in the inlet 86 to the collection tube 84, and comprises a plurality of arcuate vanes 104 that cause the incoming water-laden stream to swirl like a cyclone and expel any entrained water droplets therein against the inner wall 106 of the collection tube 84. At the same time, the flow of the carrier-gas/vapor along the wall toward the outlet 88 urges the water deposited on the wall 106 toward the outlet 88 from whence it passes through the apertures 108 and into the sump 100. The water-depleted carrier-gas/vapor in the center the collection tube 84 enters the mouth 92 of the exhaust tube 90 and exits the exhaust tube 90 through the exhaust end 94. A float switch 110 senses the level of water in the sump 100 and signals the opening and closing of a shutoff valve 112 located in a drain pipe 114 that leads to the reservoir 42 in FIG. 1. Like the switch 76 of FIG. 2, the float switch 110 will be set to trigger closing of the valve 112 before the sump 100 is completely empty, and there is sufficient water remaining in the sump 100 to provide a water seal that prevents the carrier-gas/vapor stream passing through the water-separator 82 from escaping the water-separator 82 through the drainpipe 114. In this embodiment, the water-separator is adapted for installation between system components that are in line with each other, and hence, the collection tube 84 and exhaust tube 90 share a common central axis C—C.

Figure 6:
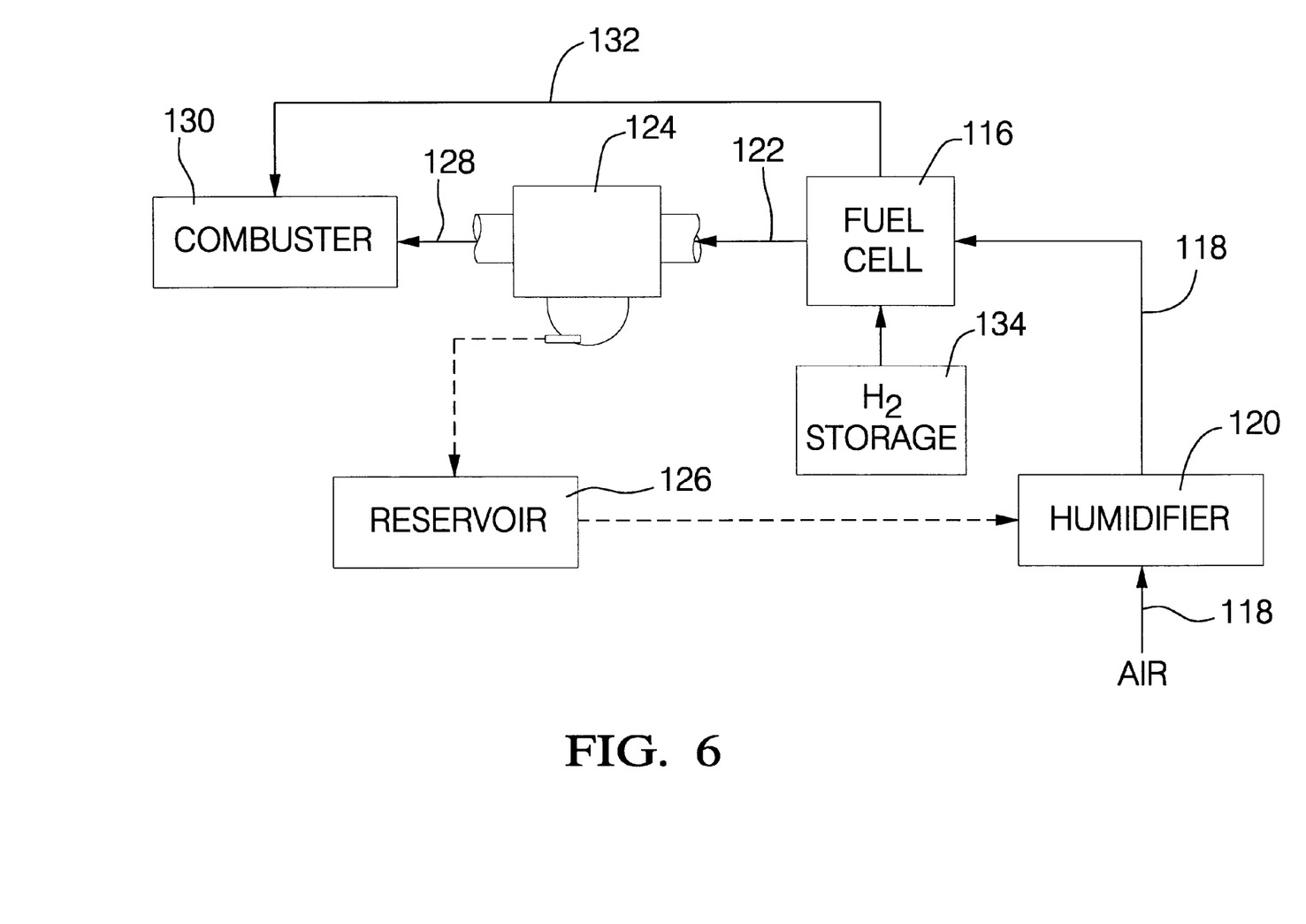
FIG. 6 is a schematic of another fuel cell system in accordance with the present invention.

FIG. 6. is a schematic of another embodiment of the fuel cell system of the present invention wherein the cathode air supplied to PEM fuel cell 116 via the stream 118 is first humidified by a humidifier 120. Water-laden cathode tailgas stream 122 enters the water-separator 124 (i.e. see FIGS. 3–5) where the entrained water therein is stripped therefrom and routed to the reservoir 126, and thence rerouted back to the humidifier 120. Liquid water-depleted cathode tailgas stream 128 is routed to a combuster 130 where it is burned along with the $H_2$ in the anode tailgas stream 132. The anode fuel stream may come from a variety of sources as discussed above, and herein shown to be stored hydrogen 134.

Figure 7:
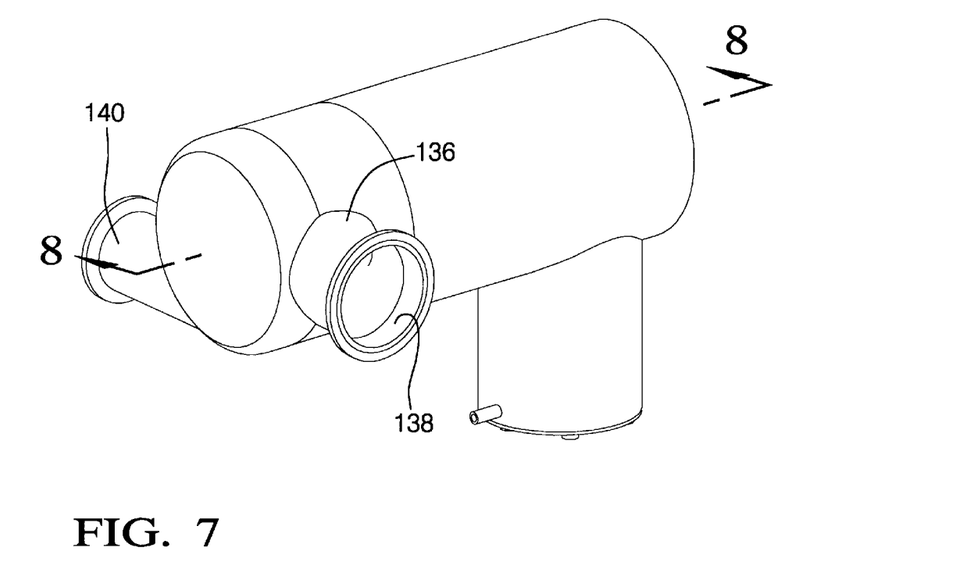
FIG. 7 is an isometric view of still another embodiment of a water separator useful in fuel cell systems in accordance with the present invention.
Figure 8:
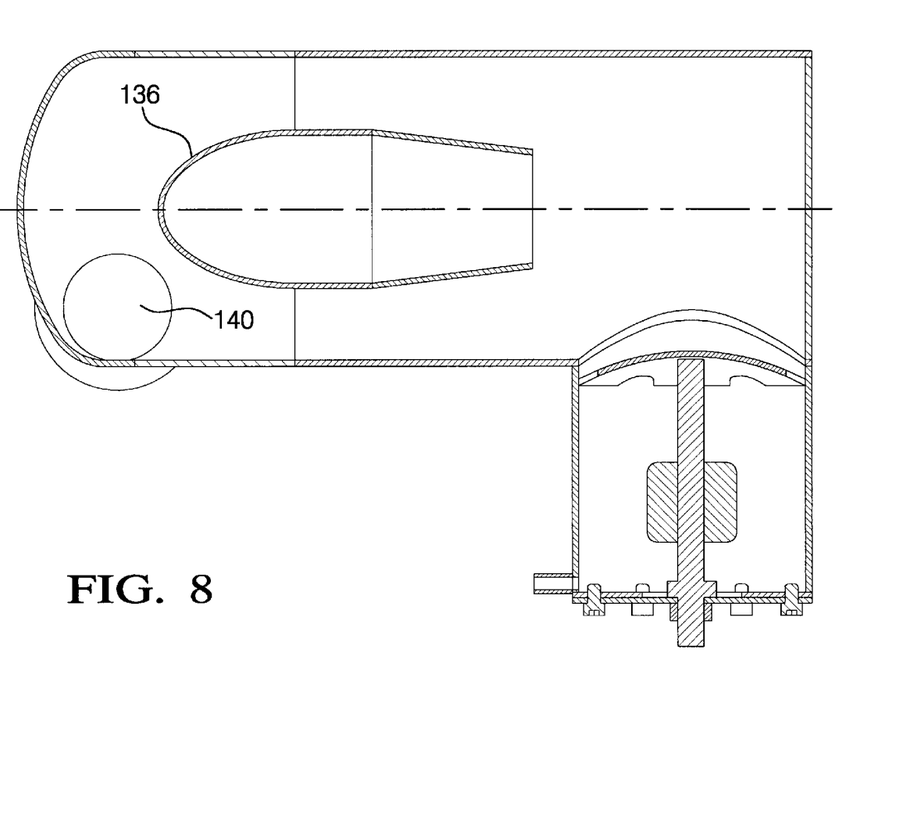
FIG. 8 is a side section view taken in the direction 8—8 of FIG. 7.

FIGS. 7 & 8 depict another embodiment of the invention that is similar to the embodiment shown in FIG. 2, but wherein the exhaust tube 136 has outlet end 138 whose centerline is slightly offset from the centerline of the inlet 148, but otherwise generally in line with the inlet 148.

While the invention has been described in terms of certain specific embodiments thereof it is not intended to be limited thereto but rather only to the extent set forth hereafter in the claims which follow. Hence, it is to be understood that the separator of the present invention could be placed at any location within the fuel cell system including downstream of the combuster. Moreover additional pieces of equipment such as combustor may be located immediately upstream of the water separator for further water removal.

What is claimed is:

1. In a fuel cell system comprising a fuel cell, a source of $H_2$-rich fuel-gas providing a fuel stream for said fuel cell, a source of oxygen providing an oxidant stream for electrochemically reacting with said $H_2$-rich fuel-gas in said fuel cell, an exhaust stream comprising $H_2$-depleted said fuel-gas, a cathode exhaust stream comprising water, oxygen and nitrogen exiting said fuel cell, at least one water separator for removing water from at least one of said streams that is laden with said water, and a reservoir for collecting the water removed from the water-laden stream for reuse within said system, the improvement wherein said separator is a cyclonic separator comprising a collection tube having an internal cylindrical wall defining a collection chamber through which said water-laden stream flows, said collection tube having an inlet through which said water-laden stream enters said chamber and an outlet through which said water exits said chamber, a swirler at said inlet to impart a whirling motion to said water-laden stream in said chamber that centrifugally propels said water out of said water-laden stream onto said wall and urges said water along said wall toward said outlet, a sump underlying said outlet for collecting water that has migrated to said outlet along said wall, a baffle between said outlet and said sump for admitting said water into said sump while preventing water in said sump from escaping said sump back into said at least one stream, a drain communicating with said sump for draining said water from said sump into said reservoir, a valve operatively associated with said drain for controlling said draining so as to maintain a sufficient level of water in said sump to provide a water seal that prevents said water-laden stream from escaping said separator via said drain, a switch associated with said sump for triggering the closing of said valve when said level is reached, an exhaust tube having a mouth at one end that is substantially concentric with said collection tube inboard said wall for receiving water-depleted said at least one stream from said chamber and an exhaust end for discharging said water-depleted said at least one stream from said separator.

2. The fuel cell system in accordance with claim 1 wherein said water-laden stream is upstream of said fuel cell.

3. The fuel cell system in accordance with claim 1 wherein said water-laden stream is downstream of said fuel cell.

4. The fuel cell system in accordance with claim 3 wherein said water-laden stream is said cathode exhaust stream.

5. In a fuel cell system comprising a fuel cell, a source of $H_2$-rich fuel-gas for fueling said fuel cell, a source of oxygen for electrochemically reacting with said $H_2$-rich fuel-gas in said fuel cell, a water separator downstream of said fuel cell for removing water from a carrier-gas exiting said fuel cell, and a reservoir for collecting the water removed from said carrier-gas for reuse within said system, the improvement wherein said separator is a cyclonic separator comprising a collection tube having an internal cylindrical wall defining a collection chamber through which said carrier-gas flows, said collection tube having an inlet through which said carrier-gas enters said chamber and an outlet through which said water exits said chamber, a swirler at said inlet to impart a whirling motion to said carrier-gas in said chamber that centrifugally propels said water out of said carrier-gas onto said wall and urges said water along said wall toward said outlet, a sump underlying said outlet for collecting water that has migrated to said outlet along said wall, a baffle between said outlet and said sump for admitting said water into said sump while preventing water in said sump from escaping said sump and re-entering said carrier-gas, a drain communicating with said sump for draining said water from said sump into said reservoir, a valve operatively associated with said drain for controlling said draining so as to maintain a sufficient level of said water in said sump to provide a water seal that prevents said carrier-gas from escaping said separator via said drain, a switch associated with said sump for triggering the closing of said valve when said level is reached, an exhaust tube having a mouth at one end that is substantially concentric with said collection tube inboard said wall for receiving water-depleted carrier-gas from said chamber and an exhaust end for discharging said water-depleted carrier-gas from said separator.

6. In a fuel cell system comprising a fuel cell, a fuel processor for converting a hydrogenous liquid into a $CO$-containing, $H_2$-rich fuel-gas for fueling said fuel cell, a water-gas-shift reactor downstream of said fuel processor for reacting said $CO$-containing, $H_2$-rich fuel-gas with steam to increase the $H_2$ content and decrease the $CO$ content of said $CO$-containing, $H_2$-rich fuel-gas, a water separator downstream of said fuel cell for removing water from a carrier gas exiting said fuel cell, and a reservoir for collecting the water removed from said carrier gas for subsequent distribution to said fuel processor and said water-gas-shift reactor, the improvement wherein said separator is a cyclonic separator comprising a collection tube having an internal cylindrical wall defining a collection chamber through which said carrier gas flows, said tube having an inlet through which said carrier gas enters said chamber and an outlet through which said water exits said chamber, a swirler at said inlet to impart a whirling motion to said carrier gas in said chamber that centrifugally propels said water out of said carrier gas and onto said wall and that urges said water along said wall toward said outlet, a sump underlying said outlet for collecting water that has migrated to said outlet along said wall, a baffle between said outlet and said sump for admitting said water into said sump while preventing water in said sump from escaping said sump and re-entering in said carrier gas, a drain communicating with said sump for draining said water from said sump into said reservoir, a valve operatively associated with said drain for controlling said draining so as to maintain a sufficient level of water in said sump to provide a water seal that prevents said carrier gas from escaping said separator via said drain, a switch associated with said sump for triggering the closing of said valve when said level is reached, an exhaust tube having a mouth at one end that is substantially concentric with said collection tube inboard said wall for receiving water-depleted carrier gas from said chamber and a exhaust end for discharging said water-depleted carrier gas from said separator.

7. The fuel cell system according to claim 6 wherein said fuel cell is a PEM fuel cell, said system further includes a humidifier for humidifying said $H_2$-rich fuel-gas before it enters said fuel cell, and said reservoir supplies water to said humidifier.

8. A fuel cell system according to claim 6 wherein said collection tube and said exhaust tube are aligned with each other along a common axis such that said inlet confronts said mouth.

9. A fuel cell system according to claim 6 herein said mouth and said collection tube lie along a common axis, and said exhaust end lies along another axis at an acute angle to said common axis.

10. A fuel cell system according to claim 6 wherein said baffle has a plurality of apertures therein through which said water enters said sump.

11. A fuel cell system according to claim 8 wherein said baffle surrounds said outlet and includes a plurality of apertures therein through which said liquid enters said sump.

12. A fuel cell system according to claim 6 wherein said swirler comprises a plurality of arcuate vanes positioned in said inlet.

13. A fuel cell system according to claim 6 wherein said swirler comprises said inlet being arranged and adapted to introduce said carrier gas tangentially into said collection tube.

14. A fuel cell system according to claim 6 wherein said collection tube has said inlet at one end, said outlet at the opposite end, an endwall adjacent said outlet, and said mouth confronts said endwall, whereby said gas flows (a) in a first general direction along said wall from said inlet toward said endwall, and (b) is deflected off said endwall so as to flow in a second general direction opposite said first general direction in the center of said collection tube and into said mouth.

\* \* \* \* \*